Dec. 10, 1929.  J. REUTHER  1,738,795
POTATO DIGGER
Filed Jan. 13, 1928  2 Sheets-Sheet 1

Inventor,
John Reuther,
by Geyer & Geyer
Attorneys.

Dec. 10, 1929.                J. REUTHER                    1,738,795
                             POTATO DIGGER
                          Filed Jan. 13, 1928          2 Sheets-Sheet  2
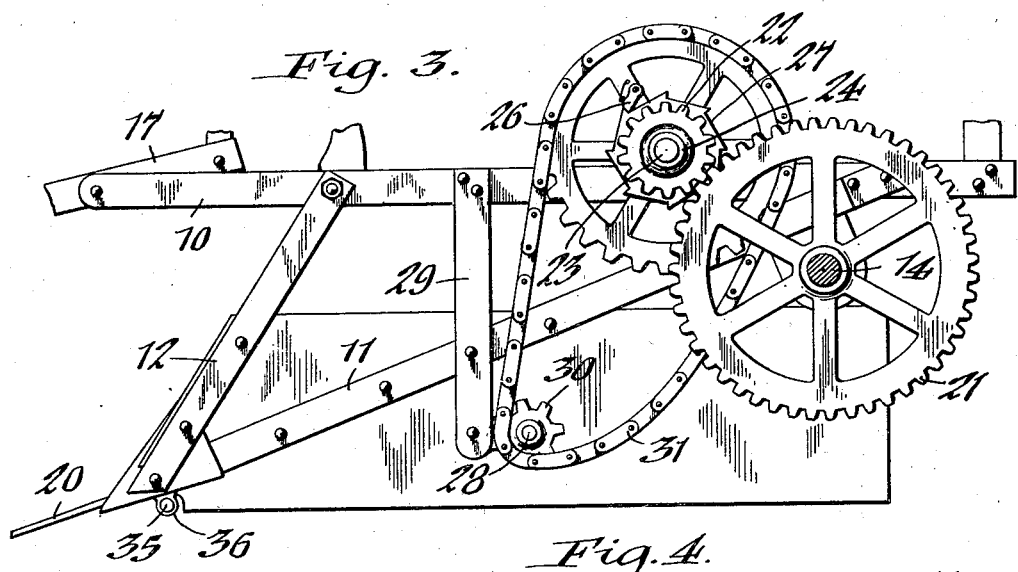
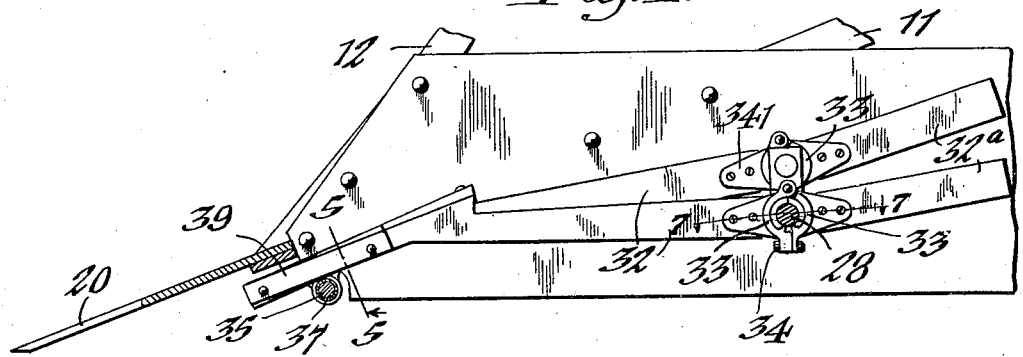
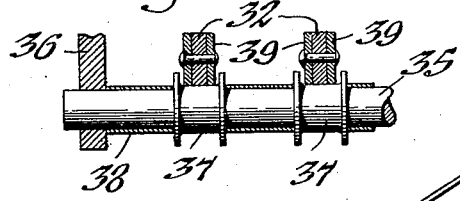
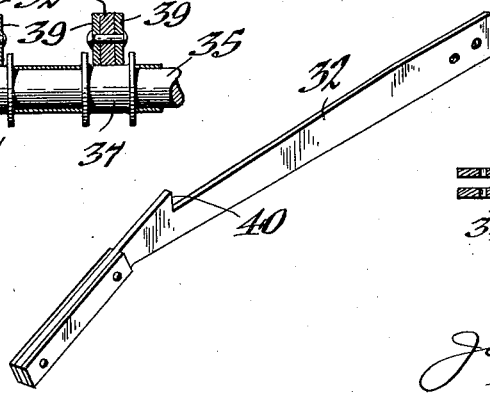
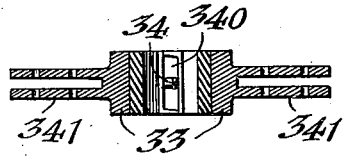
Inventor,
John Reuther,
by Geyer & Geyer
Attorneys.

Patented Dec. 10, 1929

1,738,795

UNITED STATES PATENT OFFICE

JOHN REUTHER, OF EAST AURORA, NEW YORK

POTATO DIGGER

Application filed January 13, 1928. Serial No. 246,407.

This invention relates to potato diggers of that class having a plow which enters the hills and elevates the soil, potatoes and vines, and a separator which receives the material from the plow and separates the potatoes from the earth and vines.

One of its objects is to improve the separator of such diggers with a view of increasing its agitating and separating action.

Another object of the invention is to provide a machine of this character which is simple, compact and inexpensive in construction, and whose parts are so constructed and arranged as to reduce the draft to a minimum.

In the accompanying drawings:—

Figure 1:
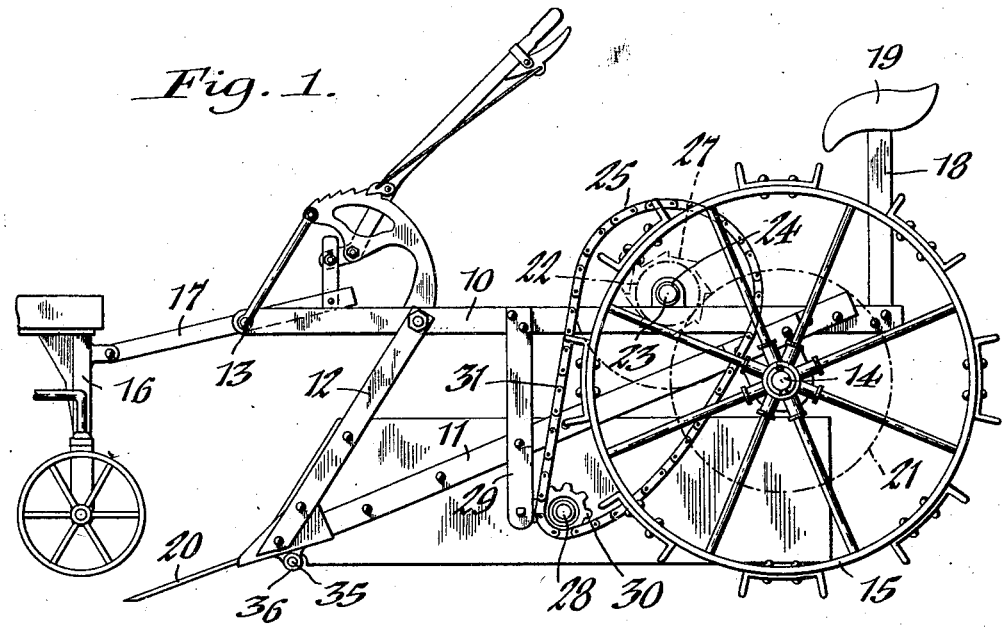
Figure 2:
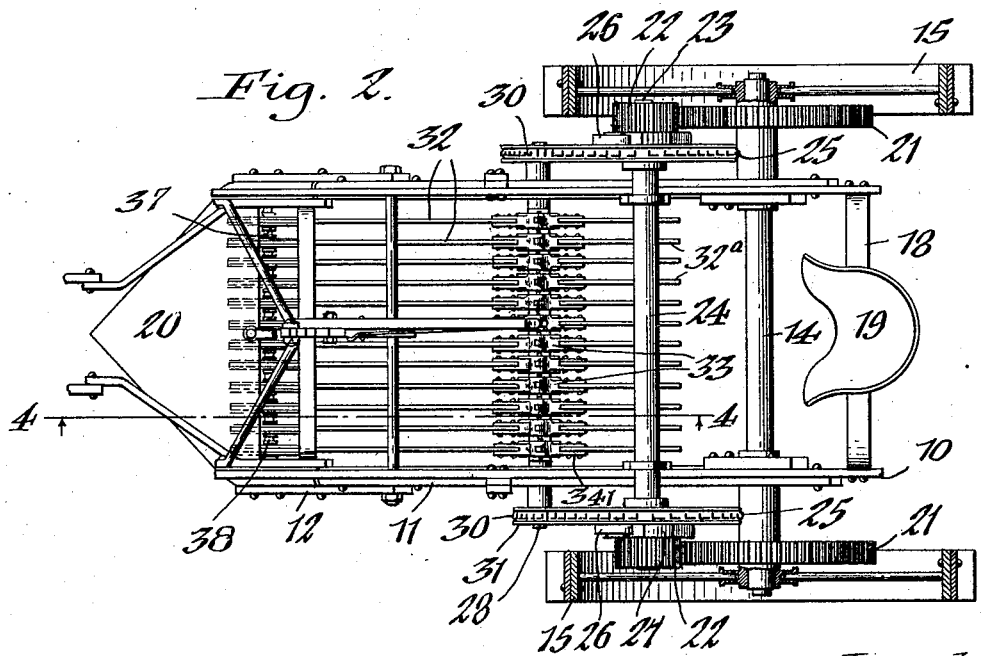

Figure 1 is a side elevation of a potato digger embodying my invention. Figure 2 is a top plan view thereof. Figure 3 is an enlarged fragmentary side elevation of the digger, partly in section, and showing the drive mechanism. Figure 4 is an enlarged longitudinal section on line 4—4, Fig. 2. Figure 5 is an enlarged fragmentary cross section on line 5—5, Figure 4. Figure 6 is a perspective view of one of the separator bars. Figure 7 is a horizontal section on line 7—7, Figure 4.

Similar characters of reference indicate corresponding parts throughout the several views.

The frame of the machine comprises horizontal side bars 10, forwardly-inclined side bars 11 fastened at their rear ends to the corresponding ends of the latter, diagonal brace bars 12 connecting the forward ends of both sets of side bars, and a tie or pivot rod 13 connecting the front ends of the horizontal side bars. This frame is supported at its rear end on the axle 14 to which the traction wheels 15 are fixed in the usual manner, while the front end of the frame is supported on the customary draft truck 16 and is pivotally connected thereto by the usual yoke 17. At its rear end the machine has a supporting yoke 18 provided with a seat 19. Suitably fastened to the front ends of the inclined frame-bars 11 is the usual pointed plow 20.

The separator mechanism, which is operatively connected to the traction wheels 15, is preferably constructed as follows:—

Fixed on the opposite ends of the axle 14 are gear wheels 21 which constantly mesh with pinions 22 fixed on the ends of a transverse counter shaft 23 disposed forwardly of the axle and extending through a hollow shaft 24 suitably supported on the machine-frame. Sprocket wheels 25 are loosely mounted on the shaft 23 and each carries a clutch dog 26 for engagement with a ratchet 27 formed on the companion pinion 22. A crank shaft 28 is arranged in the lower rear end of the machine in front of the axle 14 and is journaled in bearings applied to the lower ends of uprights 29 secured to the frame side bars 10, 11. Mounted on the ends of this crank shaft are comparatively small sprocket wheels 30 around which and the sprockets 25 drive chains 31 pass. Said sprockets 30 are preferably of different diameters for the purpose of varying the speed of rotation of the crank shaft which directly controls the movement of the separator elements 32. By this arrangement, when a comparatively slow speed is desired to be imparted to the separator, as for digging in dry ground, the drive is from that side of the machine on which the larger sprocket 30 is located, and to this end the companion sprocket wheel 25 is coupled with the respective drive pinion 22 through the medium of its clutch dog 26. For a faster speed, as when digging in wet ground, the drive is taken through the smaller sprocket on the opposite side of the machine in the same manner.

The separator elements 32, which receive the material dug up by the plow and serve to separate the potatoes from the earth and vines, preferably consist of a plurality of oscillatory bars disposed lengthwise of the machine in parallel relation and extending from the discharge end of the plow to a point forwardly of the axle 14. These separator bars are so suspended that during the travel of the machine over the ground an up and down and back and forth pitching motion is imparted to them. For this purpose, they are attached near their rear ends to suitable bearings applied to the crank shaft 28, each of said bearings preferably consisting of a pair of hinged sections 33 extending from opposite sides of the crank shaft and secured together at their lower ends by a bolt 34. The opposing lower ends of the companion sections are spaced apart at their lower ends, as shown in Figure 7, to provide an opening 340 for the discharge of dirt to prevent clogging of the bearings. Ears 341 are formed on the bearing-sections for securing the rear ends of the separator bars thereto. When digging in wet and weedy soil, bar-extensions 32ª may be secured to the rear bearing sections, such extensions being slightly inclined rearwardly and tending to hold back the dirt to insure its thorough separation.

At the front end of the machine and immediately in rear of and spaced from the bottom face of the plow 20 is a transverse rod or shaft 35 supported at its ends in brackets 36. Free to rotate on this shaft are a plurality of flanged guide spools or rollers 37 upon which the front ends of the separator bars rest by gravity and over which they are adapted to reciprocate in response to the movements imparted to them by the crank shaft 28. These guide rollers are held against endwise displacement relative to one another by spacing sleeves 38 or equivalent means. As shown in Figure 4, the front ends of the separator bars extend beneath the rear end of the plow and the space between the latter and the guide rollers is sufficient to permit a limited vertical displacement of said bars. Along their opposite sides, the front ends of the separator bars may be provided with wear plates 39.

By mounting the separator bars in the manner described, the material dug up is more evenly distributed thereover and the maximum agitation and greatest separating action takes place at the rear ends of the separator bars, where it is needed, while the least agitation of the latter takes place at the front end of the machine adjacent to the shovel. Furthermore, by disposing the crank shaft near the rear ends of the separator bars, the load imposed thereon is reduced to a minimum, the draft is correspondingly made lighter and the clutching of stones by the crank shaft is eliminated.

If desired, the separator bars 32 may be provided near their front ends and in their top edges with rearwardly-facing shoulders 40 which serve to force the dirt and potato vines toward the rear end of the separator, this structure being especially useful when the machine is working down hill.

Briefly stated, the operation of the machine is as follows:—

The potatoes, earth and vines dug up by the plow 20 pass upon the receiving ends of the separator bars 32 which act to vigorously shake the earth and break up the lumps sufficiently to allow them to pass between the bars when they are in their separated positions relative to one another. As before stated, the action of the separator bars gradually increases from their front to their rear ends, providing for a uniform distribution of the materials as they are passed on to the separator and an even flow and increased separation as they continue toward the discharge end of the separator. When working in dry or wet ground, the speed of the crank shaft 28 can be readily adjusted by driving it from the corresponding large or small sprocket 30.

While manifestly simple, compact and inexpensive in construction, this improved potato digger effects an efficient separation of the potatoes without bruising them, and its parts are so organized as to eliminate the catching of stones to reduce the draft to a minimum, and to prevent the clogging of the bearings to which the separator bars are attached. Furthermore, it is positive and reliable in operation, and when repairs are required, these can be made by the user himself and at a moderate cost.

I claim as my invention:—

1. In a potato digger, the combination of a frame, a plow, a crank shaft arranged transversely of the frame adjacent its rear end, a transverse supporting rod arranged at the front end of said frame and in spaced relation beneath the discharge end of said plow, a series of flanged guide rollers mounted on said supporting rod and held against endwise movement thereon, a plurality of separator bars arranged side by side lengthwise of the frame and connected at their rear ends to said crank shaft, the front ends of said bars resting on said rollers and guided for longitudinal movement thereon in the space between said rod and the bottom face of the plow, and wear plates applied to the sides of the front ends of said separator bars for engagement with the flanges of said guide rollers.

2. In a potato digger, the combination of a frame, a plow, a crank shaft mounted on said frame, a plurality of separator bars arranged lengthwise of the frame and journaled on said crank shaft, and bearing members for the separator bars applied to the crank shaft and each including a pair of hinged sections constructed when closed to form an opening for the discharge of foreign matter collected on the bearing walls, one of said sections having an attaching ear thereon for receiving the adjoining end of the corresponding separator bar.

3. In a potato digger, the combination of a frame, a plow, a crank shaft mounted on said frame adjacent its rear end, a guide member disposed at the front end of the frame adjacent the discharge end of the plow, bearing members on the crank shaft and each consisting of a pair of hinged sections and provided with attaching ears, and a plurality of sectional separator bars arranged lengthwise of the frame and connected at their opposing inner ends to the attaching ears of the respective bearing members, the front ends of the front bar-sections being supported on said guide member.

4. In a potato digger, the combination of a frame having an axle at its rear end, a plow, a plurality of separator bars disposed rearwardly of said plow, actuating mechanism for said separator bars including a shaft, gears fixed on the axle at its opposite ends, a counter shaft journaled in said frame and carrying pinions meshing with said gears, sprocket wheels loosely mounted on the counter shaft, companion sprocket wheels fixed on the shaft of said separator bar actuating mechanism, sprocket chains passing around said wheels, the sprocket wheels on said last-named shaft being of different diameters, and clutch means for the counter shaft sprocket wheels for controlling the drive of the crank shaft through one or the other of its sprocket wheels.

JOHN REUTHER.